US007097498B2

(12) United States Patent
Miyazaki

(10) Patent No.: US 7,097,498 B2
(45) Date of Patent: Aug. 29, 2006

(54) CONNECTOR FOR APPARATUS

(75) Inventor: Sho Miyazaki, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/873,124

(22) Filed: Jun. 23, 2004

(65) Prior Publication Data

US 2004/0266270 A1 Dec. 30, 2004

(30) Foreign Application Priority Data

Jun. 27, 2003 (JP) ............................ 2003-185186

(51) Int. Cl.
*H01R 13/73* (2006.01)
*H02B 1/01* (2006.01)

(52) U.S. Cl. ....................... 439/559; 439/362; 439/694

(58) Field of Classification Search ................ 439/559, 439/948, 682, 550, 556, 544, 891, 362, 694, 439/709
See application file for complete search history.

(56) References Cited

U.S. PATENT DOCUMENTS

| | | | | |
|---|---|---|---|---|
| 2,552,686 A * | 5/1951 | Melcher | ................. | 174/153 R |
| 6,338,651 B1 * | 1/2002 | Svette et al. | ................ | 439/559 |

FOREIGN PATENT DOCUMENTS

| | | |
|---|---|---|
| JP | A 2002-125348 | 4/2002 |

* cited by examiner

*Primary Examiner*—Javaid H. Nasri
(74) *Attorney, Agent, or Firm*—Oliff & Berridge, PLC

(57) ABSTRACT

In a connector for apparatus, an extension portion extends from a female connecting portion to an opposite side of a wire side terminal. A gap between the apparatus side terminal and an inner circumference of the apparatus side housing is sealed with a seal member which is externally fitted around the extension portion of the apparatus side terminal.

3 Claims, 13 Drawing Sheets

CONNECTOR FOR APPARATUS

FIELD OF THE INVENTION

The present invention relates to an connector for apparatus.

DESCRIPTION OF THE RELATED ART

Some of the connector for apparatus for connecting the electric wire to an apparatus such as a motor for an electric automobile have a structure in which a terminal part of the electric wire is held with a housing, which is secured to a case of the apparatus, and the wire is passed through a mounting hole of the case to connect a wire side terminal fixed to the terminal part of the wire to an apparatus side terminal within the case.

Though the connection between terminals is bolted, to allow for this bolting operation, the case is provided with a terminal base for exposing the apparatus side terminal out of the case, and after the bolting operation, a cover is placed over the terminal base to hide a connecting portion of the terminal (e.g., refer to JP-A-2002-125348).

However, in the conventional connector for apparatus, when connecting or disconnecting the wire to or from the apparatus, a troublesome operation of fastening or releasing the bolt, and an operation of mounting or dismounting the cover on or from the terminal base are required, resulting in worse operability when connecting or disconnecting the wire for the maintenance.

Thus, a structure is considered in which the wire side terminal fixed to the terminal part of the wire is contained in the wire side housing, the apparatus side housing holding the apparatus side terminal is received within the mounting hole provided in the case of apparatus, and the wire side housing is fitted into the apparatus side housing within this mounting hole to connect both terminals. With this structure, since it is unnecessary to bolt the terminals, it is not required to expose the apparatus side terminal out of the case. Accordingly, the operation of putting the cover over the terminals after bolting the terminals is not required, resulting in better operability.

In the above structure for connecting the terminals by fitting the housings, when there is a less sufficient space on the outer face side of the case, the wire side terminal is made a bus bar bent like an L-character, whereby the electric wire is laid along the outer face of the case. In this case, since the wire side terminal composed of the bus bar has a male shape, the apparatus side terminal is provided with a concave shape or female shape to fit the wire side terminal in a received state.

By the way, when the apparatus side terminal is provided with the female shape, the following problem arises in providing a structure for sealing a gap between the apparatus side terminal and the apparatus side housing. Generally, a method is employed in which when the electric wire is connected to the terminal, a barrel-like rubber plug is externally fitted around the electric wire, and the outer circumference of the rubber plug is closely contacted with the inner circumference of the housing. However, when the apparatus side terminal is disposed near the apparatus, the electric wire is unnecessary, whereby it is not technically reasonable to employ a waterproof structure in which the rubber plug is externally fitted around the electric wire.

SUMMARY OF THE INVENTION

This invention has been achieved in the light of the above-mentioned problem, and it is an object of the invention to provide a structure for sealing a gap between the apparatus side terminal not connected to the electric wire and having a female connecting portion and the apparatus side housing receiving the apparatus side terminal.

According to one aspect of the invention, An connector for apparatus including: an apparatus case having a mounting hole; an apparatus side housing mounted inside the mounting hole, and holding an apparatus side terminal having a female connecting portion; and a wire side housing holding a wire side terminal having a male connecting portion which is fixed at a terminal part of an electric wire, wherein the wire side housing is fitted into the apparatus side housing inside of the mounting hole of the apparatus case whereby the wire side terminal is connected to the apparatus side terminal by male and female fitting, an extension portion extending from the female connecting portion to an opposite side of the wire side terminal is formed in the apparatus side terminal, and a gap between the apparatus side terminal and an inner circumference of the apparatus side housing is sealed with a seal member which is externally fitted around the extension portion of the apparatus side terminal.

According to another aspect of the invention, the seal member is externally fitted around the extension portion to directly contact closely with an outer circumferential face the extension portion, and a spacer fitted into the inner circumference of the apparatus side housing is externally fitted to be closer to or contact with the seal member.

According another aspect of the invention, the extension portion is formed in a plate-like shape, a seal face on the inner circumference of the apparatus side housing is formed in a circular shape, the seal member is integrated in a contact state with the space fixed to the extension portion.

[Operation]

Since an extension portion in the form of extending from the female connecting portion to the opposite side of the wire side terminal is provided in the apparatus side terminal, a seal member externally fitted around the extension portion seals a gap between the apparatus side terminal and the inner circumference of the apparatus side housing, it is possible to securely seal the gap between the apparatus side terminal and the apparatus side housing, even in the case where the apparatus side terminal is not connected to the electric wire and has the female connecting portion.

Since the extension portion is regulated from displacement in the radial direction by the spacer, it is possible to keep the deformation amount of the seal member externally fitted around the extension portion even in the circumferential direction, exhibiting the high seal performance.

When the extension portion is like a plate, and the seal face on the inner circumference of the apparatus housing is circular, there is a largely separated portion between the outside face of the extension portion and the inner circumferential face of the apparatus housing. Therefore, if the seal member singly is externally fitted around the extension portion, it is required to increase the axial size of the seal member and prevent incorrect deformation of the seal member. However, in this invention, since the seal member is integrated in close contact with the spacer secured to the extension portion, it is possible to avoid incorrect deformation even if the seal member is shaped like a disk. Thereby, the connector for apparatus is reduced in size by making the axial size of the seal member smaller.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Embodiment 1

Figure 1:
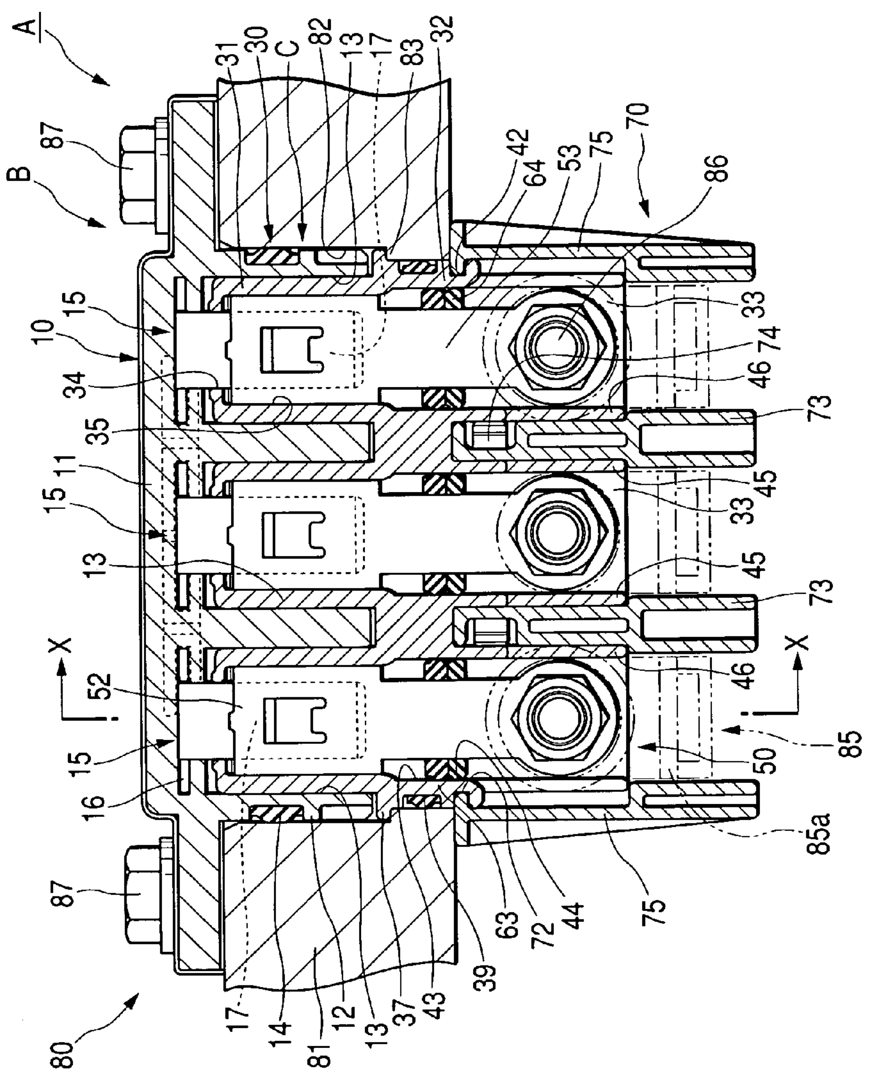
FIG. 1 is a cross-sectional view showing a state where an connector for apparatus is mounted in a shield case in an embodiment 1.
Figure 2:
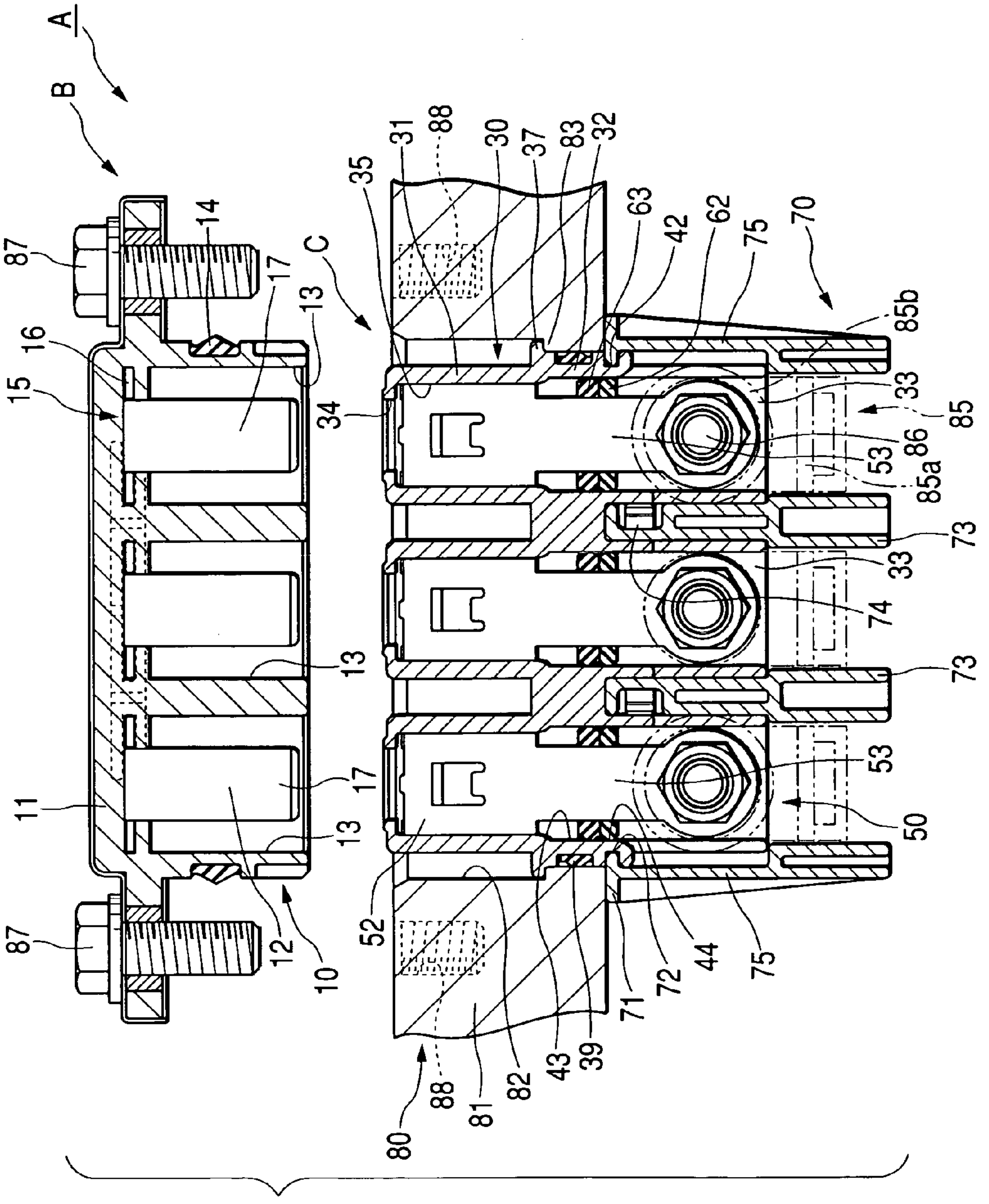
FIG. 2 is a cross-sectional view showing a state where a wire side connector is removed from the connector for apparatus in FIG. 1.
Figure 3:
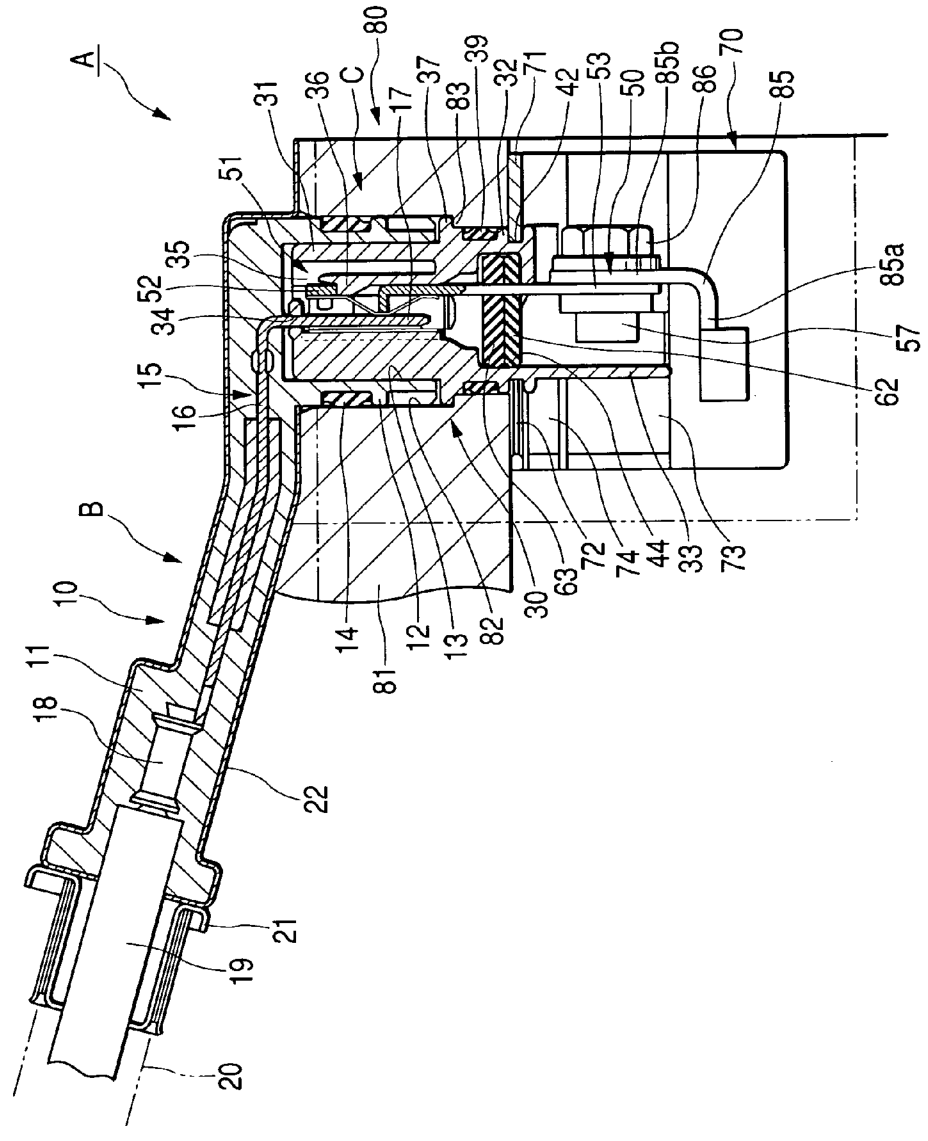
FIG. 3 is a cross-sectional view taken along the line X—X in FIG. 1.
Figure 4:
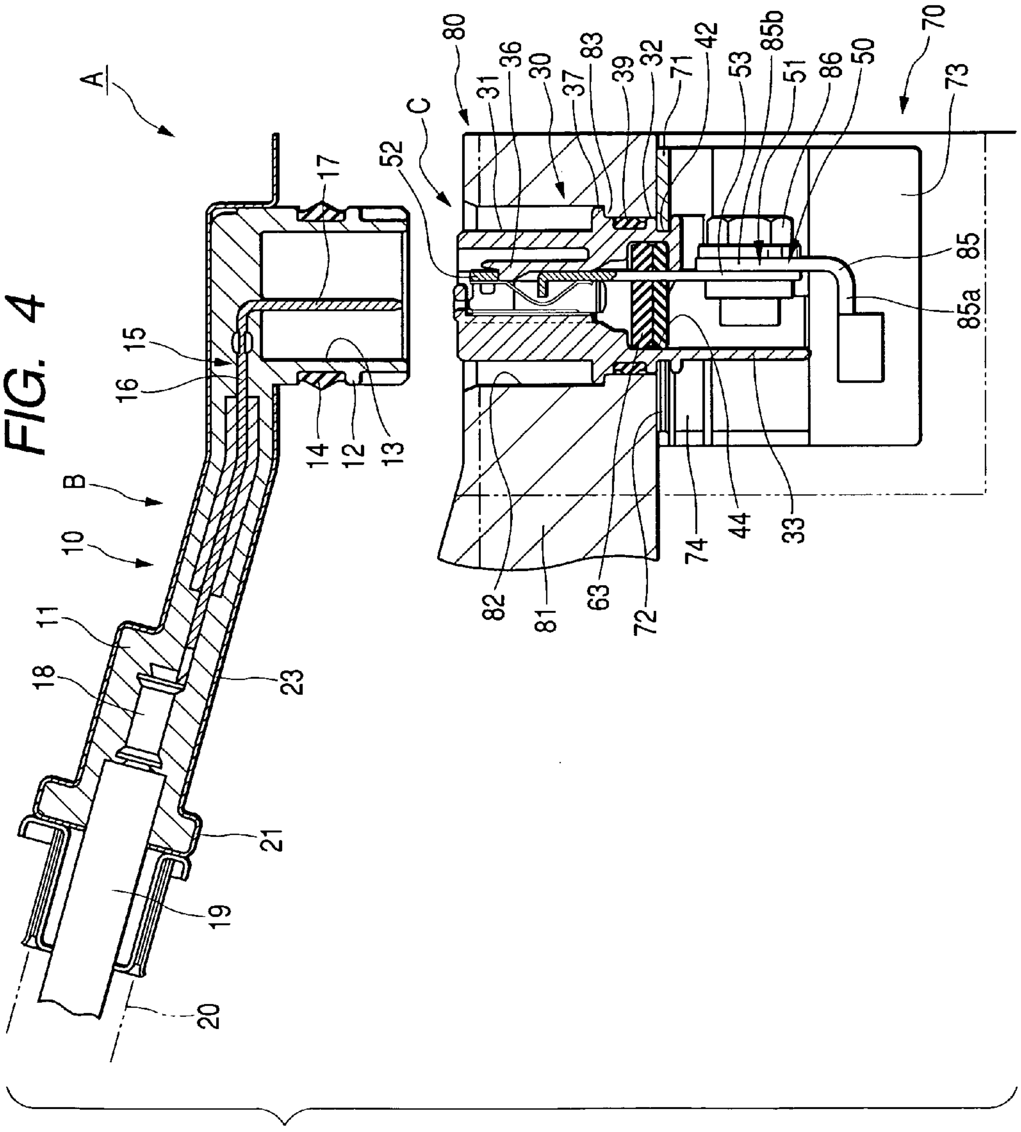
FIG. 4 is a cross-sectional view showing a state where the wire side connector is removed from the connector for apparatus in FIG. 3.
Figure 5:
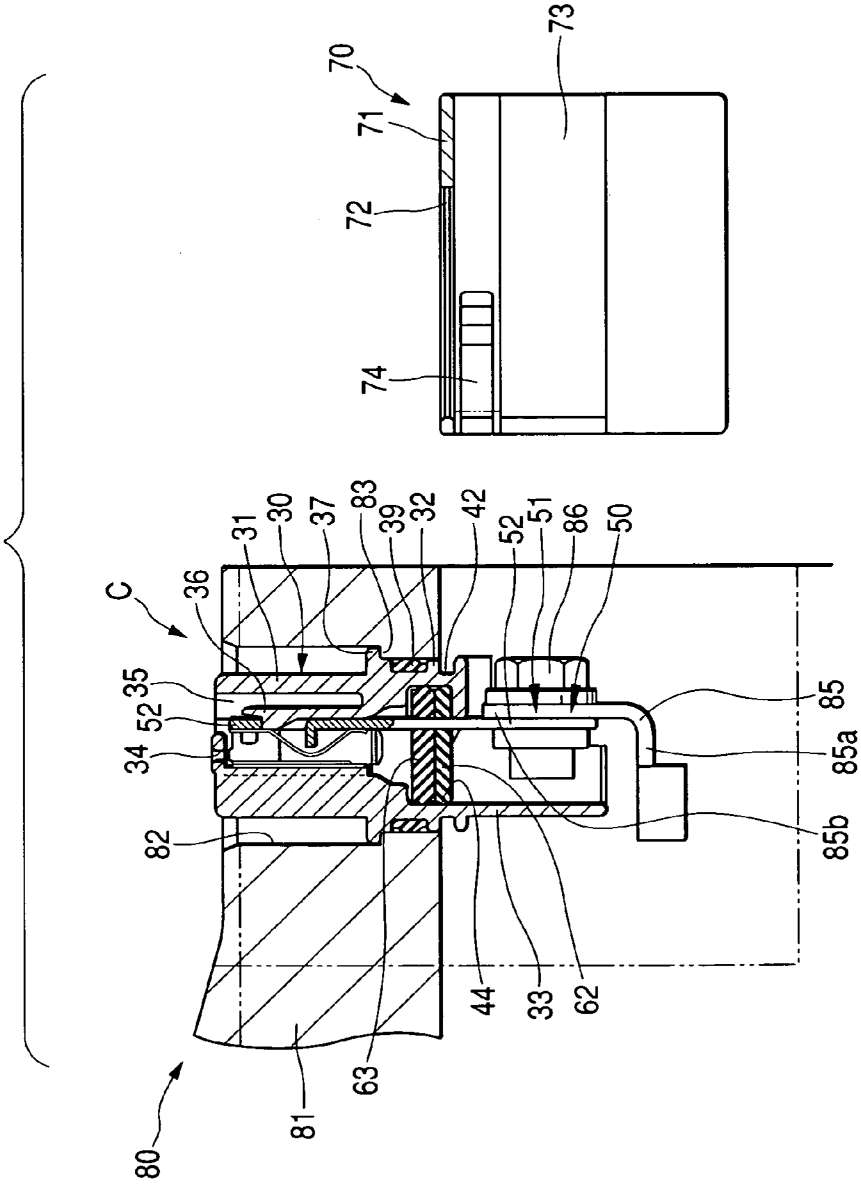
FIG. 5 is a cross-sectional view showing a state where a retainer is removed from the connector for apparatus in FIG. 4.
Figure 6:
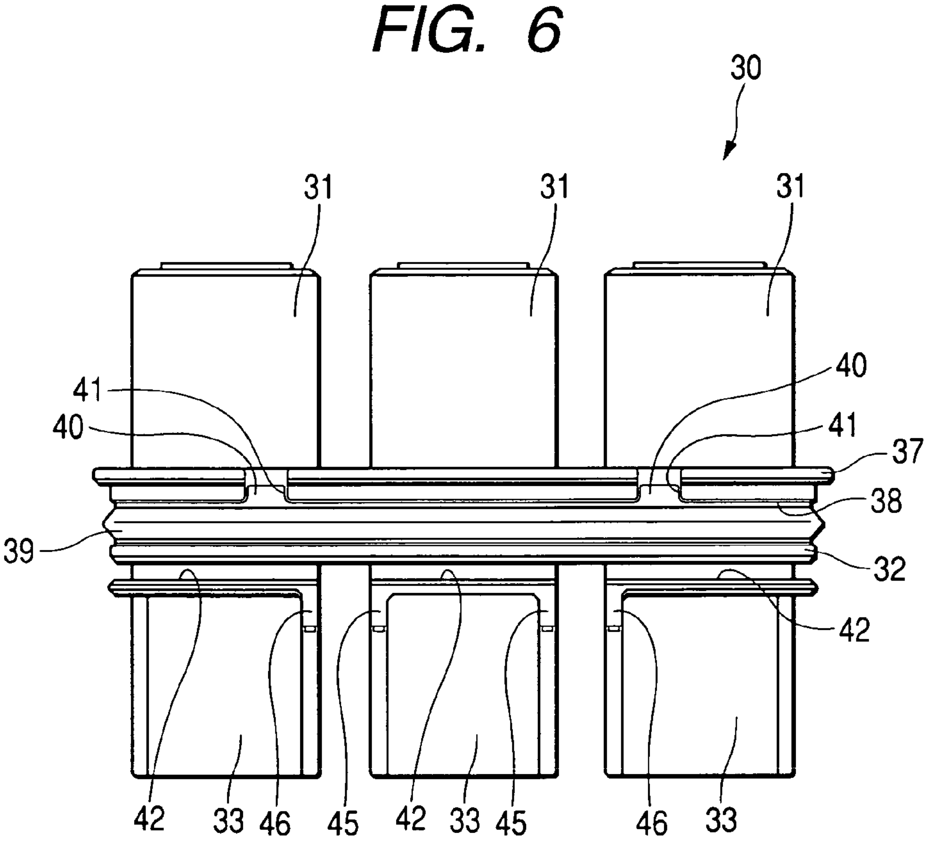
FIG. 6 is a rear view of the apparatus housing.
Figure 7:
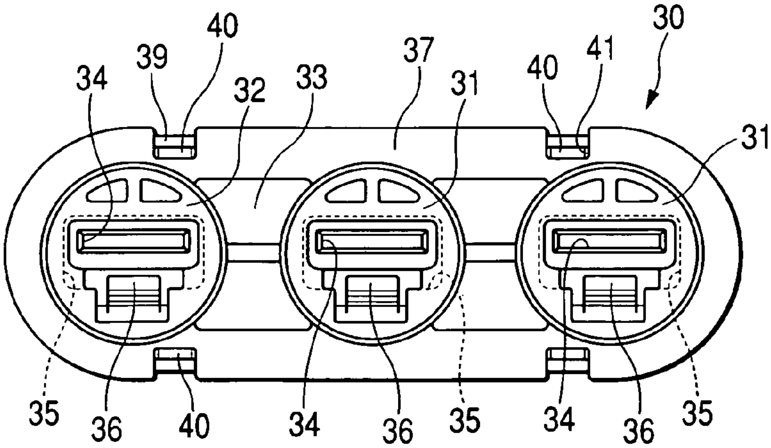
FIG. 7 is a plan view of the apparatus housing.
Figure 8:
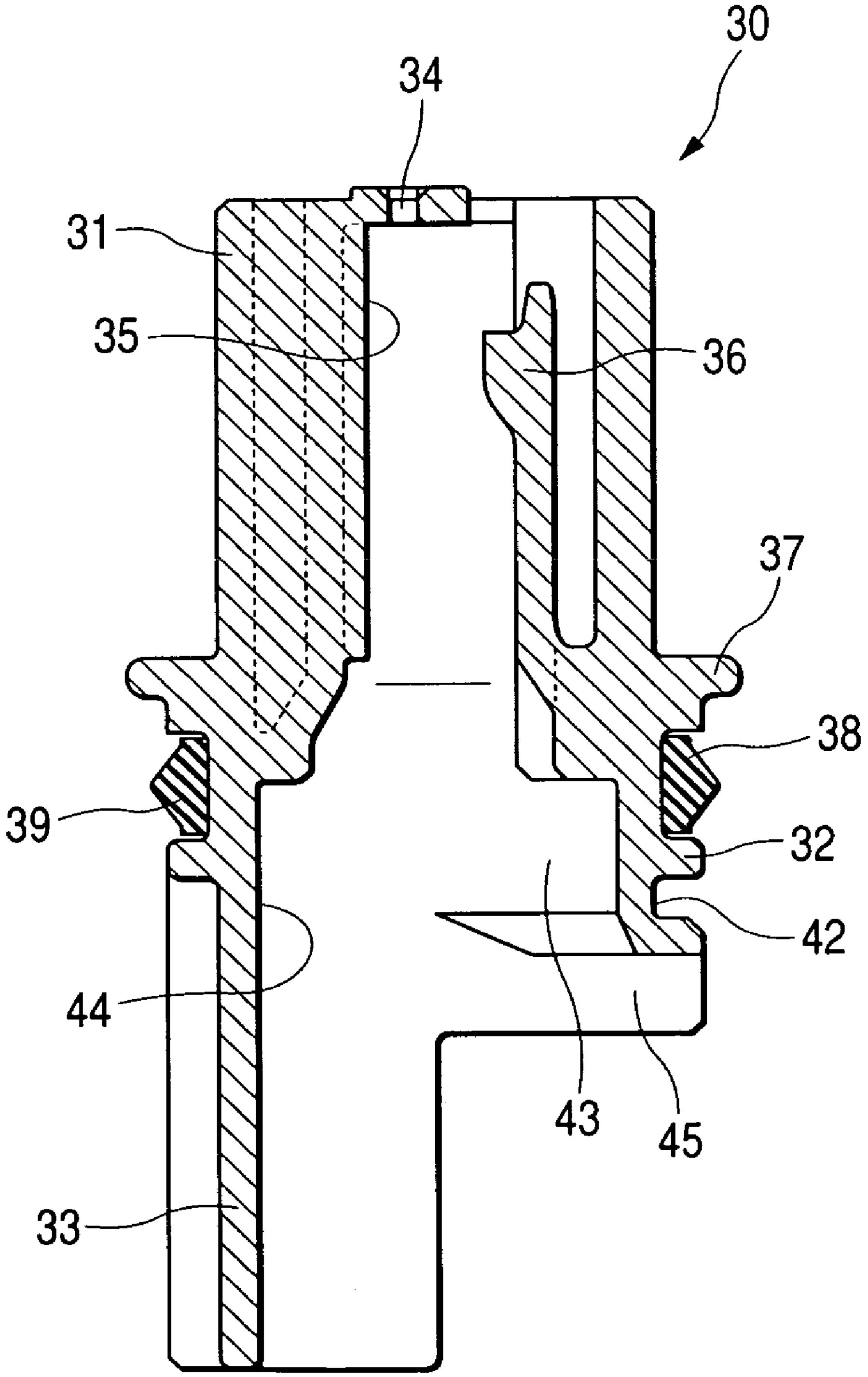
FIG. 8 is across-sectional view of the apparatus housing.
Figure 9:
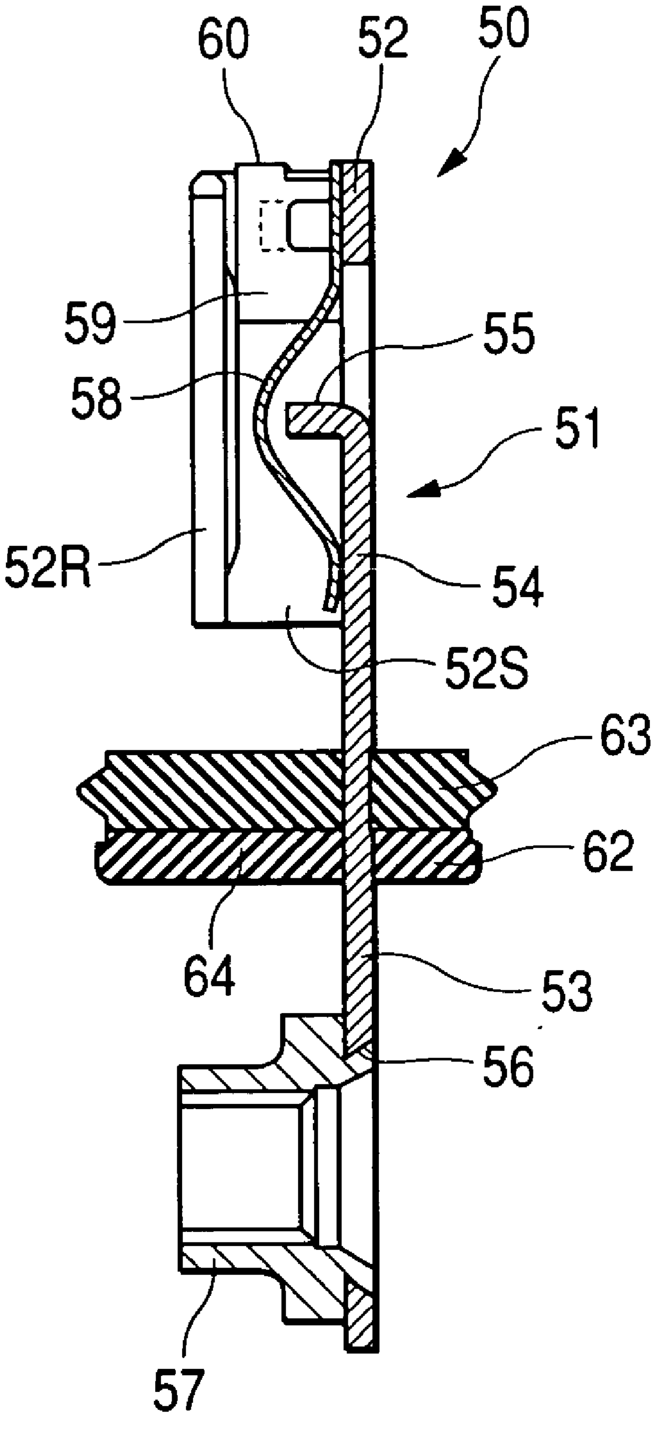
FIG. 9 is a cross-sectional view of an apparatus terminal.
Figure 10:
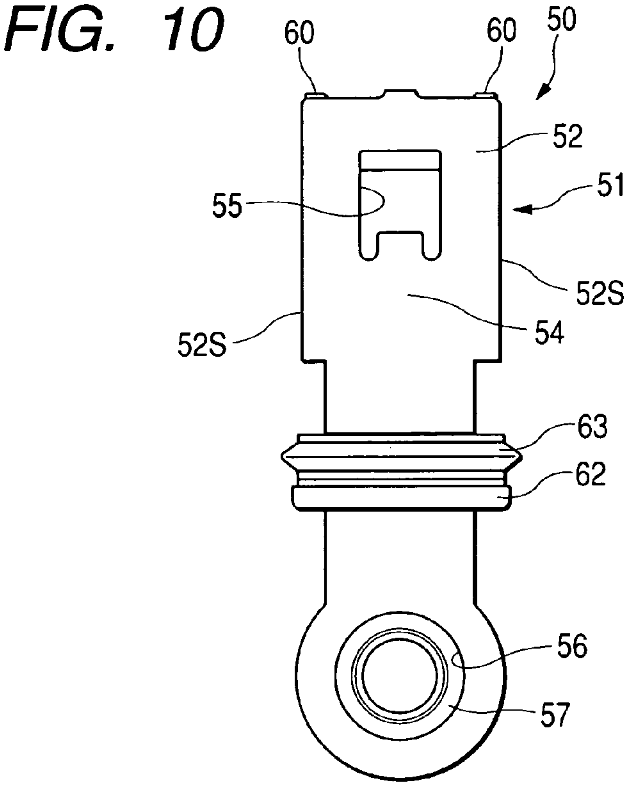
FIG. 10 is a front view of the apparatus terminal.
Figure 11:
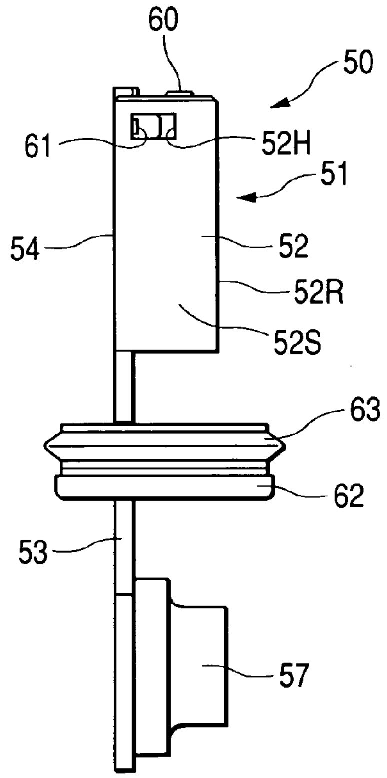
FIG. 11 is a side view of the apparatus terminal.
Figure 12:
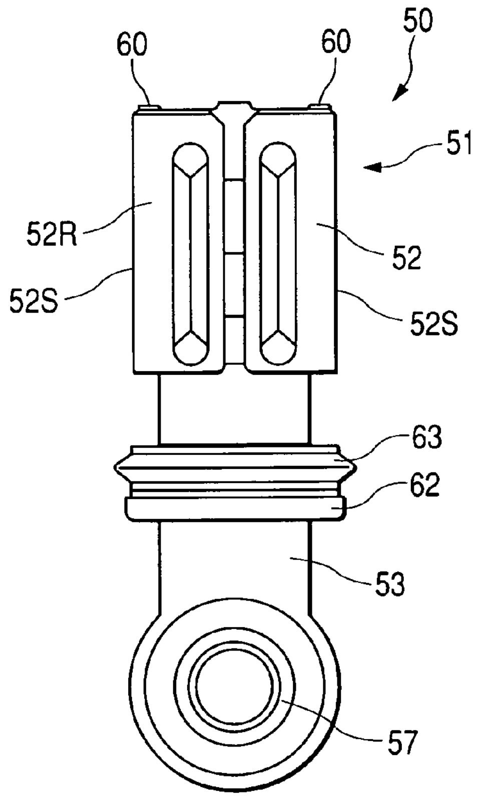
FIG. 12 is a rear view of the apparatus terminal.
Figure 13:
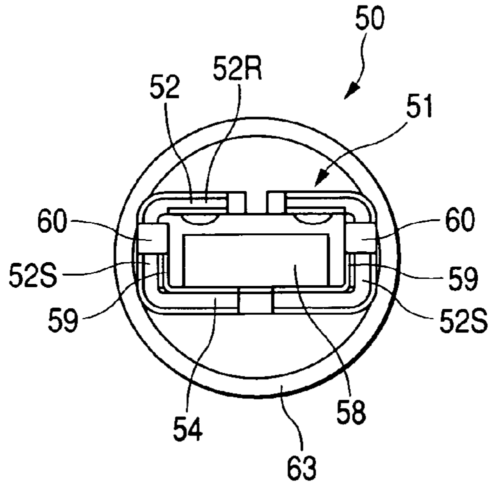
FIG. 13 is a plan view of the apparatus terminal.
Figure 14:
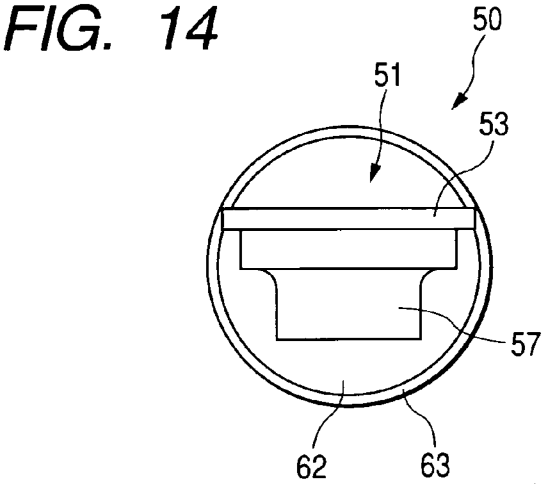
FIG. 14 is a bottom view of the apparatus terminal.
Figure 15:
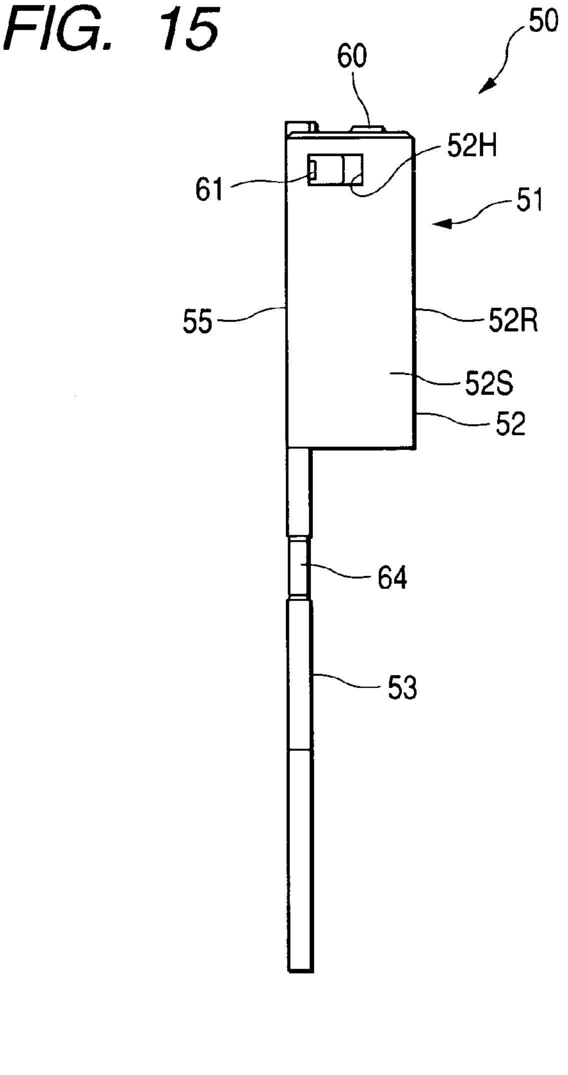
FIG. 15 is a side view of a terminal main body in the apparatus terminal.
Figure 16:
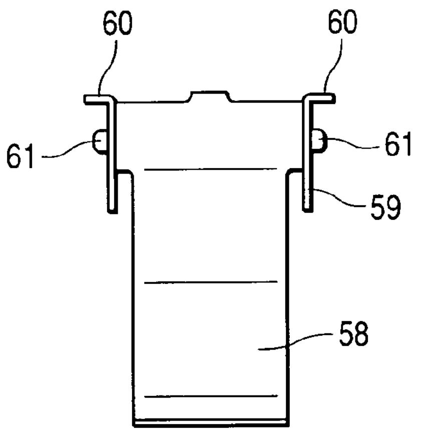
FIG. 16 is a front view of an elastic contact piece in the apparatus terminal.
Figure 17:
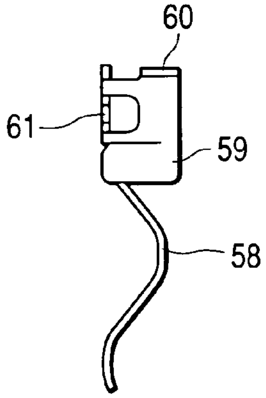
FIG. 17 is a side view of the elastic contact piece in the apparatus terminal.
Figure 18:
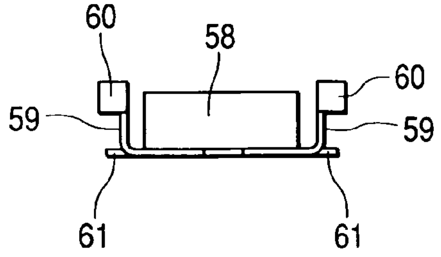
FIG. 18 is a plan view of the elastic contact piece in the apparatus terminal.

Referring to FIGS. 1 to 18, an embodiment 1 of the present invention will be described below.

First of all, an apparatus 80 in which an connector for apparatus A of this embodiment is mounted will be described below. The apparatus 80 (e.g., a motor for electric automobile, an inverter) has an apparatus main body (e.g., motor stator), not shown, that is contained within a shield case 81. On an upper face of the shield case 81, amounting hole 82 to penetrate vertically through the outside and the inside of the shield case 81 is formed. The mounting hole 82 has an oblong shape extending crosswise. A stopper 83 having a similar shape (i.e., oblong) to that of the mounting hole 82 and having a diameter of a size smaller than the mounting hole 82 is formed over the entire circumference and continuously at the lower end portion on the inner circumference of the mounting hole. Within the shield case 81, three apparatus direct coupling terminals 85 directly coupled with the apparatus main body are arranged side by side at a fixed pitch in the crosswise direction. The apparatus direct coupling terminal 85 is composed of a bus bar that is a thick metal plate bent with its plate face almost at right angles to make an L-character shape as seen from the side. A horizontal portion **85*a* of the apparatus direct coupling terminal 85 is supported in the apparatus main body, and a vertical portion 85*b* standing from a front end of the horizontal portion 85*a* is located almost directly under the mounting hole 82. This vertical portion 85*b* is connected to an apparatus side terminal 50 by a bolt 86**.

The connector for apparatus A in this embodiment will be described below.

The connector for apparatus A comprises a wire side connector B connected to a terminal part of an electric wire 24 making up a wire harness, and an apparatus side connector C that is on standby within the mounting hole 82 of the shield case 81.

The wire side connector B has three wire side terminals 15 held in an electric wire housing 10 made of synthetic resin. The electric wire housing 10 and the wire side terminal 15 are integrated by insert molding. The electric wire housing 10 has a housing main body 11 having a shape oblate as a whole and having a trailing end part inclined forwardly downwards, and an oblong fitting portion 12 protruding from a horizontal front end part of the housing main body 11 downwards, which are integrally molded. Three circular fitting concave portions opening to its lower end face and having the axial line directed vertically are formed inside the fitting portion 12. Also, an oblong seal ring 14 is fitted around the circumference of the fitting portion 12.

The wire side terminal 15 is formed by bending a metal plate and comprises a terminal main body 16 slender in the longitudinal direction and disposed within the housing main body 11, a tab-like male connecting portion 17 extending downwards from a front end part of the terminal main body 16, and a crimp-style portion 18 like an open barrel formed at a trailing end part of the terminal main body 16. The male connecting portion 17 is received within each fitting concave portion 13. An electric wire 19 is connected to the crimp-style portion 18 by pressure welding, and led out from a rear end face of the housing main body backwards.

Three electric wires 19 led out of the housing main body 11 are collectively surrounded and shielded by a shielding member 20 like an oblate barrel and composed of a braided wire. A terminal part of the shield member 20 is connected to a shield barrel 21, which is connected to a shield shell 22 fitted to closely contact with the outer face (excluding a fitting portion 12) of the wire side housing 10.

Next, the apparatus side connector C will be described below. The apparatus side connector C has three apparatus side terminals 50 held in an apparatus side housing 30 made of synthetic resin, and is secured in the mounting hole 82 by a retainer 70 made of synthetic resin.

The apparatus side housing 30 is prepared by integrally forming three cylindrical portions 31 on the left and right sides, with the axial line directed vertically, an oblong connecting portion 32 for connecting the lower ends of the cylindrical portion 31, and three arcuate wall 33 on the left and right sides, each arcuate wall shaped like a semi-cylinder, extending downwards from the connecting portion 32 and disposed to correspond to each cylindrical portion 31.

The outside diameter of the cylindrical portion 31 is made equal to the inside diameter of the fitting concave portion 13 in the wire side housing 10. A slit-like insertion opening 34 for allowing the male connecting portion 17 of the wire side terminal 15 to enter into the cylindrical portion 31 is formed on an upper wall portion of the cylindrical portion 31. Also, a cavity 35 having an angular cross section is formed within each cylindrical portion 31. This cavity 35 is provided with a lance 36 in the form of protruding upwards from a position eccentric forwards from an axial center of the cylindrical portion 31 in the connecting portion 32, the lance 36 being able to flex resiliently in the longitudinal direction.

The connecting portion 32 is fitted into the inner circumference of the stopper 83 having an oblong shape and formed at a lower end part of the mounting hole 82. An engagement rib 37 extending circumferentially is formed on an upper end portion around the circumference of the connecting portion 32. Also, a circumferential seal groove 38 is formed below the engagement rib 37 around the circumference of the connecting portion 32, and a seal ring 39 is fitted into the seal groove 38. A locating projection 40 extending upwards is formed in the seal ring 39. The seal ring 39 is positioned in the circumferential direction and regulated from being loosely moved around the circumference by engaging this locating projection 40 in a location recess 41 of the apparatus side housing 30. Also, three mounting grooves 42 coaxial with the cylindrical portions 31 and having a semi-circular shape are formed as means for engaging the retainer 70 in a circumferential front area of the connection portion 32.

Three communicating spaces 43 communicating to the cavity 35 of the cylindrical portion 31 are formed inside the connecting portion 32. A seal face 44 coaxial with the cylindrical portion 31 and having a circular shape is formed on the inner circumference of a communicating space 43. The inner diameter of the seal face 44 is larger than the size of the cavity 35 in the longitudinal direction, and almost equal to the size of the cavity 35 in the cross direction.

The arcuate wall 33 is arranged coaxially with the cylindrical portions 31, and opened to the front and lower sides. The radius of curvature of an inner circumferential face of the arcuate wall 33 is the same as the radius of the seal face 44 in the connecting portion 32. Namely, the inner circumferential face of the arcuate wall 33 is a continuous same plane with the seal face 44. Among three arcuate walls 33, a central arcuate wall 33 is formed with a pair of guide walls 45, left and right, extending linearly forwards and backwards from the upper end part of left and right edges. Each guide wall 45 extends along a lower face of the connecting portion 32, and has a slender rectangle shape in the longitudinal direction, with an inner face of the guide wall 45 being smoothly continuous with the inner circumference of the arcuate wall 33. Also, a front end face and a rear end face of this guide wall 45 are the same plane with the circumference of the connecting portion 32. On the other hand, the arcuate walls 33 located on both left and right sides are formed with the auxiliary walls 46 extending linearly forwards from the upper end part at the nearly central edge in parallel to the guide walls 45. The auxiliary walls 46, like the guide walls 45, extend along the lower face of the connecting portion 32, and has a slender rectangle shape in the longitudinal direction. The inner face of the auxiliary wall 46 is smoothly continuous with the inner circumference of the arcuate wall 33, and a front end face of the auxiliary wall 46 is the same plane with the circumference of the connecting portion 32.

The apparatus side terminal 50 is a combination of a terminal main body 51 composed of a thick plate member, and an elastic contact piece 58 having a smaller thickness than the terminal main body 51.

The terminal main body 51 comprises a female connecting portion 52 and an extension portion 53 extending downwards from the female connecting portion 52. The female connecting portion 52 is like an angular barrel penetrating vertically. A lance bore 55 engaged in the lance 36 of the cylindrical portion 31 is formed on a front face wall 54 (a plate portion constituting this invention) of the female connecting portion 52. The extension portion 53 is slender vertically, with the plate thickness direction longitudinally, and is continuous on the same plane with the front face wall 54 (plate portion) of the female connecting portion 52. Also, a circular bore 56 penetrating longitudinally is formed at a lower end part of the extension portion 53. A cylindrical internal thread body 57 is screwed in a form of protruding to the rear face side of the extension portion 53 into this circular bore 56.

On the other hand, the elastic contact piece 58 is slender vertically as a whole, and has a curved shape in which a vertically central portion is swollen backwards as seen from the side. At an upper end part of the elastic contact piece 58, a side plate 59 extending at right angle from the left and right side edges backwards is formed. An engaging pawl 60 projecting at right angle outwardly sideways is formed at an upper edge of each side plate 59, and a cut piece 61 at right angle to the side plate 59 is formed by raising a cut part outwardly sideways at a front edge of each side plate 59. This elastic contact piece 58 is attached inside the female connecting portion 52 by engaging the engaging pawl 60 at an upper edge of a side wall 52S in the female connecting portion 52, and engaging the cut piece 61 in an engagement hole 52H of the side wall 52S in the female connecting portion 52. The male connecting portion 17 of the wire side terminal 15 is resiliently pressed between the elastic contact piece 58 and a rear face wall 52R of the female connecting portion 52.

A disk-like spacer 62 with the axial line directed vertically and a disk-like seal member 63 coaxial with the spacer 62 are attached in the extension portion 53 of this apparatus side terminal 50. The outside diameter of the spacer 62 is equal to the inside diameter of the seal face 44 in the apparatus side housing 30. When the seal member 63 is not resiliently flexed, the outside diameter of the spacer 62 is larger than the inside diameter of the seal face 44. The spacer 62 and the seal member 63 are molded integrally with the extension portion 53 (secured to the extension portion 53). The spacer 62 and the seal member 63 are molded through different processes, but any order of molding may be taken. By the moldings, the seal member 63 is intimately contacted integrally on an upper face of the spacer 62. The center of the spacer 62 and the seal member 63 is eccentric to the back of the extension portion 53, but arranged almost concentrically with the female connecting portion 52. Also, a contact area of the seal member 63 among the circumference of the extension portion 53 is a constricted part 64 having a similar (rectangular) cross section to the extension portion 53, reduced in diameter over the entire circumference and tapered at four corners. Adhesives may be applied on the contact area of the seal member 63 on the outside face of the extension portion 53.

Such apparatus side terminal 50 is inserted into the apparatus side housing 30 from below. The inserted apparatus side terminal 50 is held in the apparatus side housing 30 in a state where the lance bore 55 is engaged by the lance 36 to prevent slippage (drop off). In this state, the female connecting portion 52 is received within the cavity 35 of the cylindrical portion 31, and the extension portion 53 passes through the communicating space 43 of the connecting portion 32 to be located in front of the arcuate wall 33. At this time, the lower end of the extension portion 53 is located slightly above the lower end of the arcuate wall 33. Also, the spacer 62 is contact with the seal face 44 over the entire circumference. Due to this contact, the seal member 63 fixed to the extension portion 53 is regulated from being unstably or loosely moved longitudinally or crosswise with respect to the seal face 44. Accordingly, the seal member 63 is kept contact with the seal face 44 evenly over the entire circumference.

The retainer 70 is made of synthetic resin, and is integrally molded of an upper face wall 71 and four wall portions 73, 75 extending at right angles downwards and in parallel to each other from a lower face of the upper face wall 71. The upper face wall 71 is formed with three notch portions 72 opened backwards and with a rear end portion (front end portion) shaped like a semi-circle corresponding to the cylindrical portions 31 of the apparatus side housing 30. Among the four wall portions 73, 75, two central wall portions are partition walls 73 for partitioning three notch portions 72. A flexible engagement piece 74 is formed at an upper end part of a partition wall 73. Also, two wall portions located at both left and right ends are protection walls 75.

The operation of this embodiment will be described below.

When the connector for apparatus A of this embodiment is attached to the apparatus 80, first of all, the apparatus side connector C is assembled into the shield case 81. In assembly, the apparatus side housing 30 is dropped into the mounting hole 82 from the above (from the outside face of the shield case 81), in which dropping of the apparatus side housing 30 is regulated by making the engagement rib 37 contact with the stopper 83 from the above. In this state, the mounting groove 42 at the lower end of the connecting portion 32 passes through the mounting hole 82 to be located slightly below the lower face (inner face) of the shield case 81, and the arcuate wall 33 passes through the mounting hole 82 to be located within the shield case 81.

Thereafter, inside the shield case 81, the retainer 70 is assembled into the apparatus side housing 30 from the front, and the notch portion 72 is fitted into the mounting groove 42. The assembled retainer 70 is prevented from slippage by the flexible engagement piece 74, and thereby regulated from being loosely moved in any of the vertical and cross directions, so that the retainer 70 makes contact with the inner face of the shield case 81 from below. Thereby, the apparatus side housing 30 is regulated from slipping upwards out of the shield case 81.

In a state where the retainer 70 is assembled in the apparatus side housing 30, the apparatus direct coupling terminal 85 is carried between the protection wall 75 and the partition wall 73, or between the partition walls 73, and regulated from being displaced in the cross direction (including rotation or inclination) at a fulcrum of the longitudinal axis. Also, the lower end parts located in front of the arcuate wall 33 in the apparatus side terminal 50 are separated by the partition wall 73. Similarly, the apparatus direct coupling terminals 85 are separated by the partition wall 73.

In this manner, in a state where the apparatus side housing 30 is assembled into the shield case 81, the vertical portion 85*b* of each apparatus direct coupling terminal 85 is contact with or closer to the front face of the extension portion 53 in the corresponding apparatus side terminal 50, and located oppositely, so that a bolt hole (not shown) of the apparatus direct coupling terminal 85 and the internal thread body 57 of the apparatus side terminal 50 are coaxially associated. In this state, the bolt 86 is penetrated into the bolt hole from the front, screwed with the internal thread body 57, and fastened, so that the apparatus side terminal 50 is connected with the apparatus direct coupling terminal 85.

Thereafter, the wire side connector B is assembled from the outside (above) of the shield case 81 and fitted with the apparatus side connector C. In fitting, each fitting portion 12 is fitted into the mounting hole 82 to cover the corresponding cylindrical portion 31. Then, the male connecting portion 17 of the apparatus side terminal 50 is inserted into the cylindrical portion 31 to enter the female connecting portion 52 of the apparatus side terminal 50, so that the elastic contact piece 58 is resiliently contact with the male connecting portion 17. Thereby, the wire side terminal 15 and the apparatus side terminal 50 are connected.

Also, the wire side connector B is secured to the outside face of the shield case 81 by screwing and fastening the bolt 87 penetrated through the shield shell 22 and the wire side housing 10 with an internal thread hole 88 of the shield case 81. Also, the shield shell 22 is connected with the shield case 81 to be conductible.

Also, in the state where the connector for apparatus A is attached to the apparatus 80, the seal ring 39 fitted around the circumference of the apparatus side housing 30 is provided to waterproof a gap between the mounting hole 82 and the apparatus side connector C. Accordingly, it is not feared that a liquid outside the shield case 81 flows through the mounting hole 82 into the shield case 81, or an oil within the shield case 81 leaks through the mounting hole 82 out of the shield case 81. Water entering from outside of the shield case 81 into the fitting portion between the wire side connector B and the apparatus side connector C is waterproofed by the two seal rings 14 and 39.

Since the inside of the apparatus side housing 30 faces the shield case 81, an oil within the shield case 81 may flow through a gap between the apparatus side housing 30 and the apparatus side terminal 50 into a connecting portion between the wire side terminal 15 and the apparatus side terminal 50, and further through a gap between the wire side housing 10 and the wire side terminal 15 into the wire 24. However, in this embodiment, because the seal member 63 is fitted around the circumference of the apparatus side terminal 50, it is not feared that oil flows into the connecting portion between the terminals 15 and 50, and the wire 24.

As described above, in this embodiment, the apparatus side terminal 50 is provided with the extension portion 53 extending from the female connecting portion 52 to the opposite side of the wire side terminal 15, in which a gap between the circumference of the apparatus side terminal 50 and the inner circumference of the apparatus side housing 30 is sealed by the seal member 63 fitted around the extension portion 53. Even in the form in which the apparatus side terminal 50 is not connected to the electric wire, and has a female connecting portion, it is possible to fully seal a gap between the apparatus side terminal 50 and the apparatus side housing 30.

The seal member 63 is fitted around the extension portion 53 to contact directly with the outer circumferential face thereof. Also, the spacer 62 is provided to be adjacent with the seal member 63 and fitted with the inner circumference of the apparatus side housing 30, in which the circumference of this spacer 62 is contact with the seal face 44 of the apparatus side housing 30 over the entire circumference to regulate a displacement in the diametrical direction (longitudinal or cross direction) of the extension portion 53. Accordingly, the deformation amount of the seal member 63 (elastic adhesion to the seal face 44) is kept even and constant in the circumferential direction, producing the high sealing performance.

Also, in this embodiment, the extension portion 53 is like a plate, and eccentric forwardly, while the seal face 44 around the inner circumference of the apparatus side housing 40 is circular, whereby the rear face of the extension portion 53 and the seal face 44 are greatly separated. Therefore, if the seal member 63 has a structure of singly sealing around the extension portion 53, it is required to increase the axial (vertical) size of the seal member 63 and prevent incorrect deformation of the seal member 63 (deformation other than elastic deflection in the diametrical direction). However, in this embodiment, since the spacer 62 is secured to the extension portion 53, and integrated in a state where the seal member 63 is intimately contact with the upper face of the spacer 62, it is possible to avoid incorrect deformation (deformation in which the upper and lower faces of the seal member 63 are curved) even if the seal member 63 is shaped like disk. That is, the size of the seal member 63 is reduced by making the axial size smaller, and the total size of the apparatus side connector C is reduced.

Embodiment 2

Figure 19:
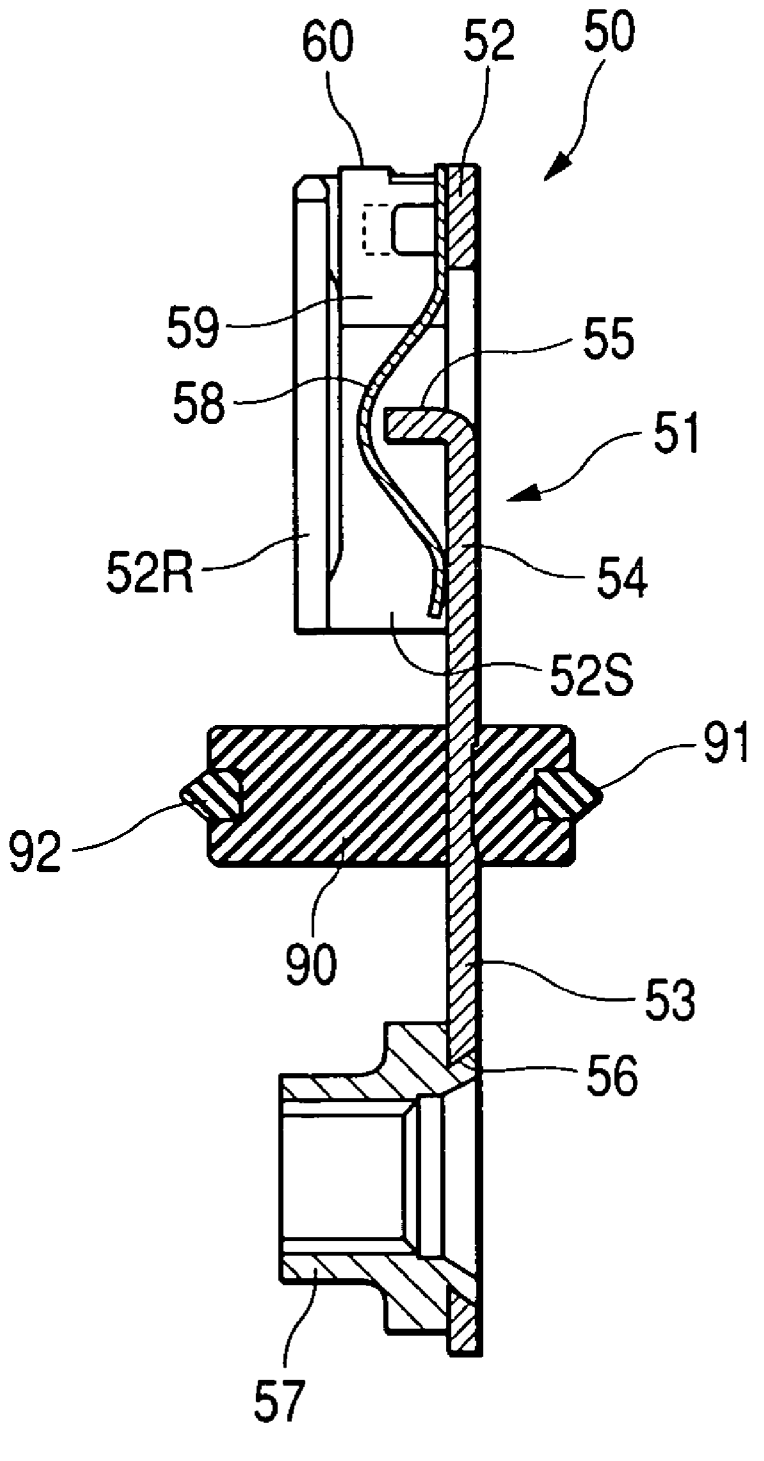
FIG. 19 is a cross-sectional view of an apparatus terminal according to an embodiment 2.

Referring to FIG. 19, an embodiment 2 of the invention will be described below.

The embodiment 2 is different from the embodiment 1, in that a spacer 90 and a seal member 91 are attached to the extension portion 53. The other constitution is the same as that of the embodiment 1. The same parts are designated by the same numerals, and the description of the structure, action and effect is omitted.

In the embodiment 1, the spacer 62 and the seal member 63 are directly fitted around the extension portion 53, while in the embodiment 2, the spacer 90 alone is directly fitted around the extension portion 53 but the seal member 91 is like a ring to be fitted into a seal groove 92 formed around the circumference of the spacer 90 and attached around the spacer 90. In this embodiment 2, the spacer 90 after molding is fixed to the extension portion 53, but may be molded integrally with the extension portion 53. Likewise, the seal member 91 may be molded integrally with the outer circumference of the spacer 90, not limited to a form that the seal member 91 after molding is fitted to the seal groove 92.

Other embodiments

This invention is not limited to the embodiments as described above with reference to the drawings, but the following embodiments may fall within the technical scope of the invention, and various variations may be made thereto without departing the spirit or scope of the invention.

(1) Though in the embodiment 1, the spacer is disposed to contact with the seal member, the spacer may not be provided in this invention. In this case, if the axial size of the seal member is increased, an incorrect deformation of the seal member can be less likely to occur.

(2) Though in the embodiment 1, the spacer is disposed in contact with the seal member, the seal member and the spacer may be disposed out of contact and closely in this invention.

(3) Though in the embodiments, the seal member is intimately contacted with the upper face of the spacer, the seal member may be contacted with the lower face of the spacer in this invention. Also, the seal member may be sandwiched between two spacers, or two seal members may be disposed on the upper and lower sides of one spacer.

(4) Though in the above embodiments, the spacer and the seal member are integrally molded, the molded spacer and the seal member may be assembled into the extension portion and fixed together by adhesives in this invention.

(5) Though in the above embodiments, the spacer is secured to the extension portion by molding, the molded spacer may be fitted around the extension portion and fixed together by adhesives in this invention.

(6) Though in the above embodiments, the seal member is molded around the extension portion, the molded seal member may be fitted around the extension portion in this invention. In this case, the seal member may be only contacted with the extension portion due to an elastic force, and not secured, or may be secured to the extension portion by adhesives, or secured to the spacer by adhesives, but not to the extension portion.

(7) Though in the above embodiments, the conductive path by the wire is shielded, this invention is applicable to a case where the conductive path is not required to shield.

(8) Though in the above embodiments, a plurality of apparatus side terminals are collectively held in one apparatus side housing, only one apparatus side terminal may be held on one apparatus side housing in this invention. In this case, the plurality of apparatus side housings may be kept from slippage by one retainer, or each apparatus side housing may be kept from slippage by the retainer.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A connector for an apparatus, comprising:

an apparatus case having a mounting hole;

an apparatus side housing mounted inside the mounting hole, and holding an apparatus side terminal having a female connecting portion; and a wire side housing holding a wire side terminal having a male connecting portion that is fixed at a terminal part of an electric wire, the wire side housing being fitted into the apparatus side housing inside of the mounting hole of the apparatus case such that the wire side terminal is connected to the apparatus side terminal by a male and a female fitting;

an extension portion extending from the female connecting portion to an opposite side of the wire side terminal, and formed in the apparatus side terminal; and a gap between the apparatus side terminal and an inner circumference of the apparatus side housing, the gap being sealed with a seal member that is externally fitted around the extension portion of the apparatus side terminal.

2. The connector for an apparatus according to claim 1, wherein the seal member is externally fitted around the extension portion to directly contact an outer circumferential face of the extension portion, and further comprising a spacer fitted into the inner circumference of the apparatus side housing in contact with the seal member.

3. The connector for an apparatus according to claim 2, wherein the extension portion has a plate-like shape, the seal member is in contact with the extension portion, and further comprising a seal face formed in a circular shape on the inner circumference of the apparatus side housing.

* * * * *